United States Patent

Jones

[11] 3,888,191
[45] June 10, 1975

[54] VEHICLE HOLDDOWN

[75] Inventor: Roland P. Jones, Westland, Mich.

[73] Assignee: Cast Metal Industries, Inc., Farmington, Mich.

[22] Filed: July 15, 1974

[21] Appl. No.: 488,547

[52] U.S. Cl. ............................................. 105/477
[51] Int. Cl. ........................................... B61d 45/00
[58] Field of Search .................... 105/477, 484, 502

[56] References Cited
UNITED STATES PATENTS

| | | | |
|---|---|---|---|
| 3,564,577 | 2/1971 | Blunden et al. | 105/477 |
| 3,589,304 | 6/1971 | Haynes | 105/477 |

Primary Examiner—M. Henson Wood, Jr.
Assistant Examiner—Gene A. Church
Attorney, Agent, or Firm—Cullen, Settle, Sloman & Cantor

[57] ABSTRACT

In a vehicle holddown which is slidably engaged within rails fixed upon a transport support deck, for temporarily fastening vehicles upon the deck, each of the holddown locking shafts which engage within pre-selected holes in the rails for locking the holddown in pre-selected places along the rails, is provided with an improved and simplified retraction lever that is protected by a wall-like plate which also served to manually locate and help move the lever by feel, without actually having to visually see the lever.

2 Claims, 9 Drawing Figures

VEHICLE HOLDDOWN

BACKGROUND OF INVENTION

The invention herein relates to an improved vehicle holddown of the type disclosed in U.S. Pat. No. 3,566,803 issued Mar. 2, 1971 to Blunden and Peisner. In general, such holddowns are used to secure automobiles and similar vehicles upon the decks of railroad flat cars and similar transport vehicles. Conventionally, channel-shaped rails are fastened upon the transport deck and holddowns are slidably fitted within such rails and fixed at predetermined points therein. Vehicles placed upon the decks are then connected by chains or similar flexible connecting devices to the holddowns, thereby temporarily fixing the vehicles upon the deck for transport of the vehicles.

In the type of holddown disclosed in the aforementioned patent, the holddowns are connected to the rails by means of retractable pins or shafts which may be extended to engage into one of a number of spaced holes formed in the rails. The retraction and extension of such pins or shafts for changing the position of the holddowns along the lengths of the rails is a troublesome problem for a number of reasons. For example, since the holddowns are constantly exposed to varying climactic conditions as the railroad car or other transport is moved about the country, the holddown parts frequently corrode and stick so that the pins can be moved only with considerable difficulty and the use of tools. Further, the holddowns are necessarily low in height so that mechanisms for moving the pins or shafts must be low and small and thus difficult to grasp manually, particularly after vehicles are loaded upon the transport deck thereby tending to obscure vision of the holddowns and requiring operation and movement thereof principally by feel rather than by actual clear vision of the device.

In the above mentioned patent, the mechanism for controlling the operation of the retractable pins or shafts for locking the holddowns to the rails generally consists of a slidable detent device which interlocks with the pins and is controlled by a handle. Such construction is relatively expensive, is relatively hard to operate, particularly under corrosion conditions and, at times may be accidentally operated.

Thus, the invention herein relates to an improvement in the pin or shaft operating mechanism of the holddown which substantially reduces the cost of the holddown device while sumultaneously making it easier to operate and protecting it against damage or inadvertent operation.

SUMMARY OF INVENTION

By way of example, the holddown of this application is described as being similar in construction and operation to that disclosed in the above mentioned U.S. Pat. No. 3,566,803. The improvement herein generally relates to forming an L-shaped slot in each of the opposite end walls of the holddown through which a pin-like handle or lever is extended and inserted through a transverse hole formed in its respective locking shaft. The lever is held to the shaft by the pressure of a coil spring having an end abutted against the lever, beneath a head formed on the end thereof, with the opposite end of the spring bearing against the holddown body so as to spring bias the shaft in a direction where one end of the shaft will extend transversely or sideways of the body to engage in one of a number of holes formed in the vertical leg of the channel shaped rail within which the holddown is slidably positioned.

Thus, the pin-like lever moves within the long horizontal leg of the L-shaped slot, with the shaft, and can be manually pulled in a shaft retracting direction, into the vertical short leg of the slot for retracting and holding the shaft in a retracted position. When the lever is in the shaft retracted position, it is arranged closely adjacent to and is protected by a portion of the end wall of the body which portion is shaped as a vertically arranged U-shaped channel provided on the body for engagement with a tensioning tool normally used in pulling the holddown along the length of the rail. Thus, the wall of the extension forms a protective element to protect against accidental bumping or movement of the lever to permit the shaft to extend outwardly when not desired. At the same time, the extension serves as a feeler or locating means wherein the lever can be located by feel without the necessity of actually seeing it. In addition the extension cooperates with the lever so that the operator of the device, by grasping the lever and the extension simultaneously in one hand uses the extension as a reaction point or grip for moving the lever.

With this construction, all other types of detents or locking mechanisms previously used, such as that disclosed in the aforementioned patent, may be completely eliminated thereby reducing the cost of the device considerably and simultaneously making it much easier to operate. For example, in the event of corrosion, a simple tap on the lever with a bar or hard object will cause the lever to drop down and thereby release the shaft for extension due to its spring force.

Restated, the invention herein contemplates the use of a pin-like lever which is fastened to the locking shaft by means of the coil spring which is utilized for spring biasing the shaft for extension, wherein the lever is protected by means of the already existing end wall extension which in turn is used as a reaction point and locating means for access to and location of and handling of the lever, which lever additionally functions as a guide pin for the locking shaft. In addition, this construction makes it possible to lower the profile of the overall holddown in that any detent operating mechanisms previously used and which were extended above the height of the holddown are eliminated. Since the automotive vehicle mounted upon the transport deck has very limited clearance above the transport deck as possible, even small fractions of an inch eliminated from the height of the holddown become significant.

These and further objects and advantages of this invention will become apparent upon reading the following description, of which the attached drawings form a part.

DETAILED DESCRIPTION

Figure 1:
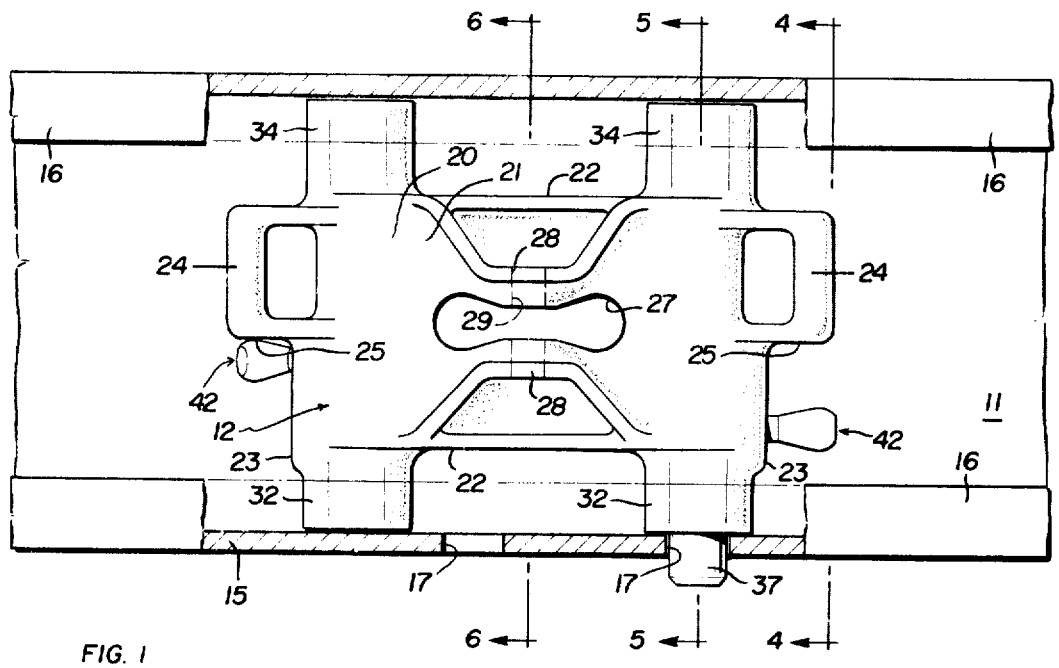
FIG. 1 is a top plan view of the holddown of this invention, mounted within a fragmentary section of a conventional channel-like rail.
Figure 2:
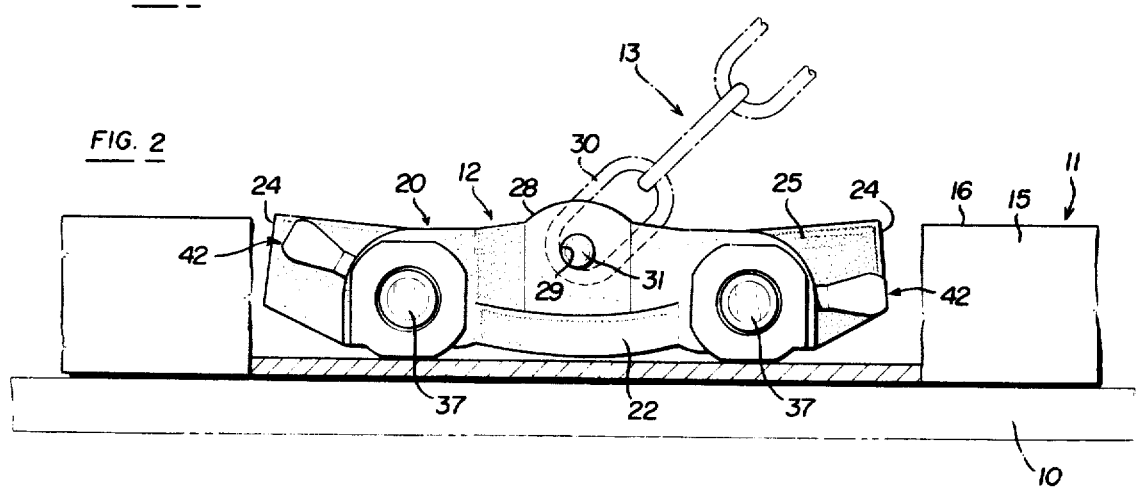
FIG. 2 is a side elevational view of the holddown mounted upon a fragmentary portion of the rail secured to a deck which is schematically shown.
Figure 3:
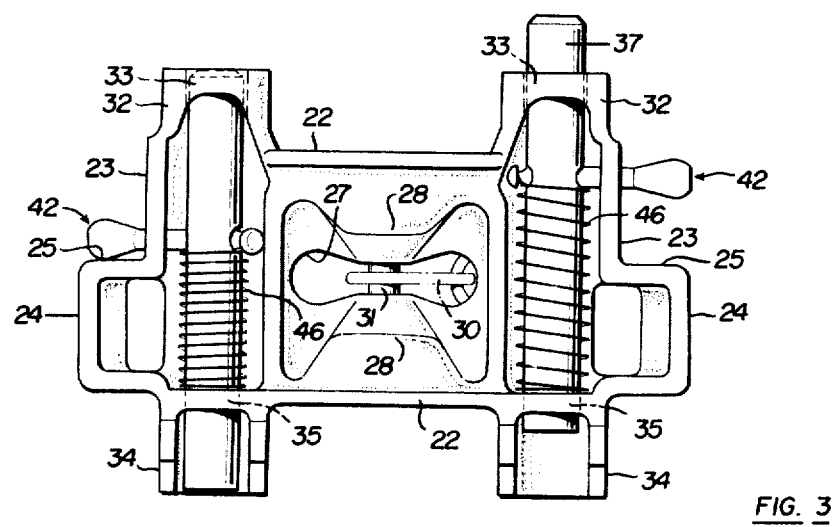
FIG. 3 is a bottom view of the holddown per se.
Figure 4:
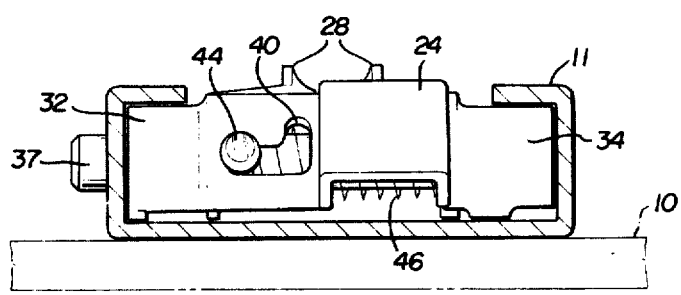
FIG. 4 is an end view of the holddown within the rail taken in the direction of arrows 4-4 of FIG. 1.
Figure 5:
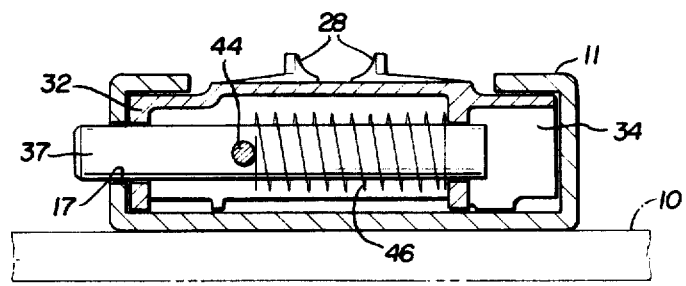
FIGS. 5 and 6 are cross-sectional views of the holddown alone, taken in the direction of arrows 5-5 and 6-6, respectively, of FIG. 1.
Figure 6:
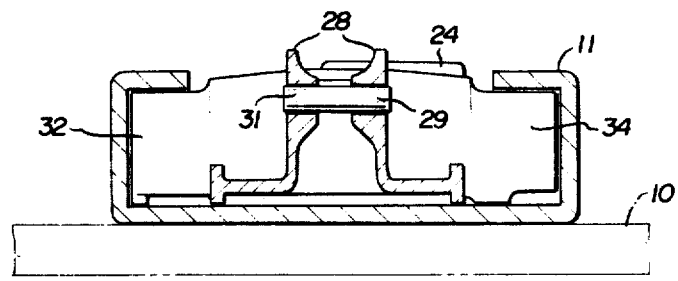
Figure 7:
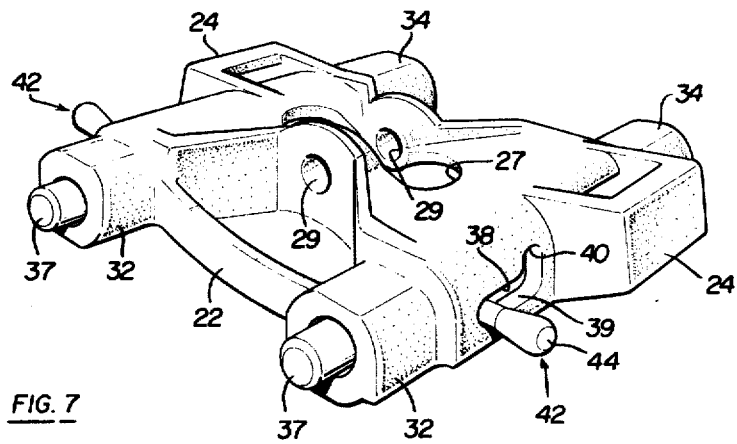
FIG. 7 is a perspective view of the holddown.
Figure 8:
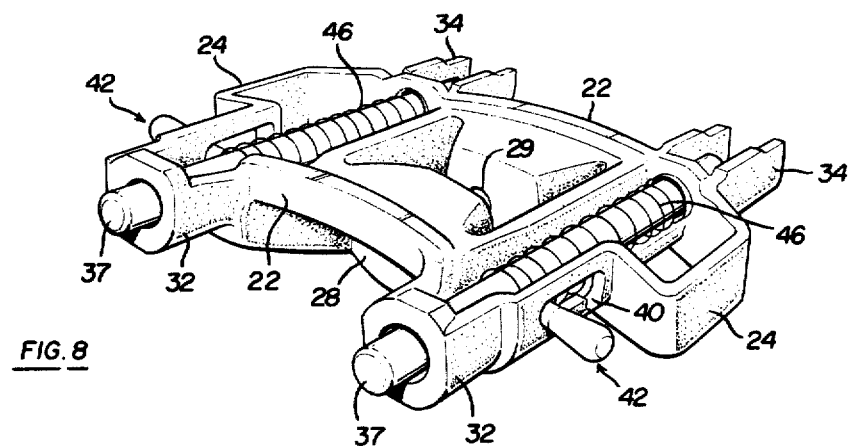
FIG. 8 is a perspective bottom view of the holddown.
Figure 9:
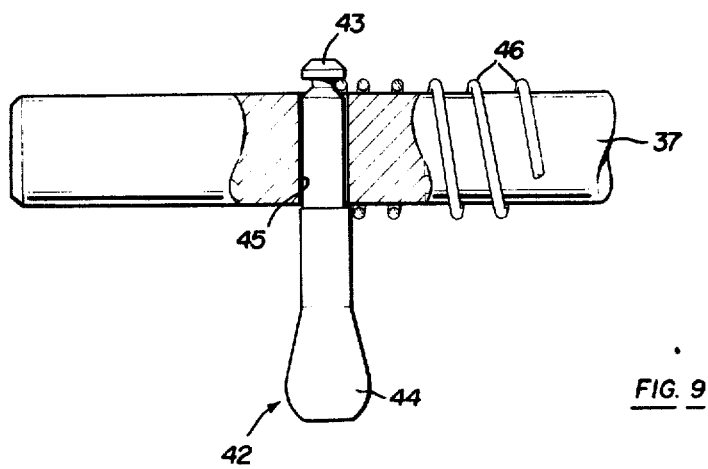
FIG. 9 is an enlarged fragmentary view illustrating the connection between the holddown locking shaft and its operating lever.

The complete holddown system includes a transport deck 10, shown schematically in FIG. 2, which consists of the upper surface of a railroad flat car or similar transport device upon which an automotive vehicle or the like is to be secured for transport, and a channel-shaped rail 11 secured to such deck. Normally, two such rails are used on a deck, spaced apart and parallel to each other.

Slidably fitted within the channel-shaped rail are a number of holddowns 12. The vehicle to be transported is connected to the holddowns by means of a flexible connector such as a link chain 13 having one end connected to the holddown and the opposite end connected to a part of the vehicle (not shown).

Conventionally, the legs 15 of the channel shaped rail 11 are provided with narrow inturned flanges 16 and also with a number of spaced holes 17.

The holddown 12 may be formed of a steel casting or the like, formed in the shape of a roughly rectangular shaped, flat body part 20, which is hollow or box-like an upper wall 21, side walls 22 and end walls 23. The end walls are step-shaped to form integral U-shaped extensions 24 which open vertically upwardly and downwardly so that they may be connected with conventional tools used for pulling the holddown along the length of the rail, particularly for tensioning it as is known to those skilled in the art.

The extensions 24 are offset relative to the longitudinal axis of the body so that they form centrally located plate-like extension portions 25 between the sides of the body and extending roughly the vertical height of the body.

The upper wall 21 is provided with a dumbell shaped slot 27 and the upper wall is centrally narrowed to form spaced apart ears 28 having aligned holes 29. Thus, a chain link 30 or similarly shaped connector end may be inserted through the upper wall, between the ears, and secured thereto by means of a pin 31 pushed through the aligned holes 29.

At the corners of the body integral, transversely or sidewise extending bosses are formed. By way of example, closed end, hollow bosses 32 are formed on one side and are provided with openings 33 at their closed ends. The opposite side of the body is provided with downwardly open, hollow bosses 34 having openings 35 in the wall from which the bosses extend.

A pair of locking shafts 37 are slidably mounted with the respective opposed pairs of bosses 32-34 for axial or endwise movement into one of two positions, namely, a fully retracted position wherein the shafts are contained within the bosses and body or an extended position wherein one end of a shaft may extend outwardly of a boss 32 and into a hole 17 in the leg 15 of the rail 11.

L-shaped slots 38 are formed in each of the end walls of the body. Each of these slots has a horizontal long leg 39 and a short upwardly extending leg 40 which is located closely adjacent the extension 24, and particularly at the plate-like portion 25 of the extension.

A pin-like lever 42 is extended through each of the slots. Each lever has a grooved inner end which forms a head portion 43 and an outer handle-shaped portion end 44. The inner end of the lever, including the head portion, slidably fits through a transverse hole 45 formed in the shaft. Surrounding each shaft is a coil spring 46 having one end abutted against the lever beneath its head 43 to thereby lock the lever against removal from the shaft, with the opposite end of the spring abutted against the body wall portion defining the hole 35 of the boss 34. Thus, the lever may be easily removed and the device disassembled, simply by turning the holddown upside down and with a screwdriver, prying the end of the coil spring away from the lever and its head to thereby permit the lever to be manually withdrawn from the shaft hole and the L-shaped slot.

In operation, the workmen operating the device, manually slide the lever 42 towards the extension wall 25, then by tipping it upwardly, lock the respective shafts in retracted position, against the spring force. Now, the holddown is slid lengthwise along the rail to its predetermined position. By means of using two shafts, and holes in the rail which are not spaced apart the same distance as are the shafts, closer adjustment of the holddown to desired position is possible. When the holddown is in the desired position where either one or the other of its shafts is aligned with a preselected hole in the rail, the workman simply taps the lever 42 causing it to swing downwardly and thereby enter the long portion of the L-shaped slot which permits the spring 46 to force the respective shaft into its outwardly extended position, that is, in engagement with the hole.

Conversely, to release the holddown from the rail, the workman manually grasps the shaft 42 and can simultaneously grasp, at the same time with the same hand, either the entire extension 24 or by inserting his thumb within the U-shaped central portion of the extension, use the extension as a reaction point to thereby squeeze the lever towards the plate-like portion 25 to return the lever into the short portion of the slot and thereby retract and hold the shaft retracted.

As can be seen, the extension 24 and particularly its plate-like portion 25 protects the lever which is closely adjacent thereto, against inadvertent blows or contacts which might otherwise damage it or inadvertently release it. Thus, the lever is sized so as to be within the upper edge and vertical edge peripheries of the plate like portion 25, rather than extending upwardly above the extension or outwardly of the vertical edge of the extension. Because the lever is angled upwardly, relative to the shaft when the shaft is retracted, it may be easily released by a simple tap on its free end with either a hammer, or any other available tool, or even a stone. Thus, it can be easily released even where they might have been some stickiness due to corrosion. Even where the shaft is corroded in its retracted position to the point where the spring will not force it outwardly, it is possible to force a screwdriver or similar tool between the extension wall 25 and the lever end to thereby wedge them apart and break the corrosion and thereby permit the shaft to extend.

Significantly, by locating the lever where it is adjacent to and protected by the extension, the lever may be easily found by a workman by feel, without actually seeing it. This may be necessary particularly where an automotive vehicle is already loaded upon the deck and thereby obscures the view of the holddown.

Having fully described an operative embodiment of this invention, I now claim:

1. In a vehicle holddown for use in slidably fitting and engaging within an upwardly opening channel having narrow, inwardly turned flanges formed on the upper edges of its legs, with the channel fixed upon a supporting deck, with the holddown formed of a roughly rectangularly shaped, hollow relatively flat body having a generally horizontally arranged upper wall and integral, downwardly extending side and end walls; with means formed on the upper wall for engagement with and end of a connector member whose opposite end is formed for engagement with a vehicle to be supported upon the deck and secured to the holddown; and transversely extending, hollow bosses, integral with the body side walls near the corners of the body to form a pair of axially aligned, journal forming members at each of the ends of the body, with the bosses each arranged to extend beneath its adjacent channel flange;

a horizontally accessed shaft slidably journalled through each pair of bosses, each shaft being retractable to fit within the body and bosses and being endwise slidable to extend one end of the shaft a short distance transversely outwardly of one of its bosses for engaging within a pre-selected one of a number of spaced apart shaft receiving openings formed in one of the legs of the channel;

and each end wall being formed with an integral, approximately vertically arranged and longitudinally extending plate-like extension portion arranged roughly near the middle of its respective end wall, so that the extension portion is approximately arranged centrally of and normal to and is of the height of its respective end wall, the improvement comprising:

an L-shaped slot formed in each end wall, with each slot having a long, horizontal leg terminating near said one boss through which the shaft end extends outwardly, and a short upwardly extending leg which is located closely adjacent to said extension portion;

a pin-like lever extending through each slot, with each lever having an inner end portion fixedly engaged with its adjacent shaft and an outer end portion axially extending longitudinally of the body and normally extending at an upwardly directed acute angle, i.e., upwardly from its shaft towards the upper edge of its adjacent extension portion through the short slot leg when its shaft is retracted within the body and bosses, and with the free end of said lever outer portion generally arranged no higher than the upper edge of its extension and no further longitudinally outwardly than the free edge of its extension and being closely adjacent to its extension portion, wherein the lever outer end portion is normally protected by its closely adjacent portion;

and said lever outer portions each being swingable downwardly into the horizontal leg of its respective slot by means of a manually applied downwardly directed force upon its free end;

and a coil compression spring surrounding a portion of said shaft and having its opposite ends abutted against the shaft lever and a body portion for spring urging the shaft endwise to extend transversely outwardly of said one boss, wherein the lever slidably moves along the length of the long leg of its slot during endwise movement of the shaft, and wherein the shaft may be retracted by manually grasping the free end of the lever and also the extension portion and moving the lever along the slot long leg and upwardly into the slot short leg;

whereby an operator of the holddown may manually locate, grasp and move the lever blindly by feel alone, without actual view of the lever.

2. A construction as defined in claim 1, and wherein the inner end portion of each lever is connected to its respective shaft by extending completely through a transverse opening formed in its shaft, and with the lever inner end portion terminating in a head portion of a size to pass through such shaft transverse opening; and with the coil spring having an end portion engaging the lever between its head and adjacent shaft surface to thereby retain the lever head from being withdrawn back through the shaft opening unless the spring end portion is deliberately removed away from the lever and the lever head.

* * * * *